US012752718B2

(12) United States Patent
Rupp

(10) Patent No.: US 12,752,718 B2
(45) Date of Patent: Oct. 6, 2026

(54) PILLAR GARNISH ASSEMBLY FOR A VEHICLE

(71) Applicant: Honda Motor Co., Ltd., Tokyo (JP)

(72) Inventor: Timothy J. Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 18/583,654

(22) Filed: Feb. 21, 2024

(65) Prior Publication Data

US 2025/0263028 A1 Aug. 21, 2025

(51) Int. Cl.

| | |
|---|---|
| ***B60R 13/04*** | (2006.01) |
| ***B60J 10/70*** | (2016.01) |
| ***B62D 25/04*** | (2006.01) |
| ***B62D 25/06*** | (2006.01) |

(52) U.S. Cl.

CPC ............... *B60R 13/04* (2013.01); *B60J 10/70* (2016.02); *B62D 25/04* (2013.01); *B62D 25/06* (2013.01)

(58) Field of Classification Search

CPC ...... B62D 25/04; B62D 25/06; B60R 13/025; B60R 13/04; B60R 13/06; B60R 13/07; B60J 10/70

USPC ........................................... 296/193.06, 1.08

See application file for complete search history.

(56) References Cited

U.S. PATENT DOCUMENTS 8,398,157 B2 3/2013 Marquette
9,205,732 B1 12/2015 Nakamichi
9,783,242 B2 10/2017 Watanabe et al.
9,862,424 B2 1/2018 Yamamoto
10,525,622 B2 1/2020 Kamiya
10,843,639 B2 11/2020 Morishita et al.
11,142,255 B2 10/2021 Ikeda et al.
2013/0076065 A1* 3/2013 Inoue ...................... B60R 13/04 296/180.1
2014/0015269 A1* 1/2014 Bland ...................... B60J 10/36 52/716.5
2018/0273104 A1* 9/2018 Ikeda ..................... B62D 25/04
2019/0126986 A1* 5/2019 Ikeda ..................... B62D 25/04
2019/0233018 A1* 8/2019 Tanaka .................. B60R 21/213
2020/0215996 A1* 7/2020 Morishita ................ B60J 10/70
(Continued)

FOREIGN PATENT DOCUMENTS

CN 110053672 B 8/2020
JP 3218948 U 11/2018
(Continued)

*Primary Examiner* — Gregory A Blankenship

(74) *Attorney, Agent, or Firm* — Morgan Lincoln; American Honda Motor Co., Inc.

(57) ABSTRACT

A pillar garnish assembly for a vehicle includes a pillar garnish adapted to be provided on a front surface of a pillar of the vehicle. The pillar garnish includes an inner pillar garnish structure adapted to be engaged with the pillar. The inner garnish structure includes a first portion adapted to be connected to the pillar and cover the front surface of the pillar, and a second portion extending in a lateral direction from the first portion and arranged at a vertical offset from the first portion defining a step therebetween. The second portion includes a free edge that is adapted to extend over a front windshield of the vehicle and defines a chamfer. The pillar garnish also includes an outer garnish structure arranged overlapping, at least partially, to the first portion and supported on the first portion of the inner garnish structure.

6 Claims, 4 Drawing Sheets

(56) References Cited

U.S. PATENT DOCUMENTS

| | | | | |
|---|---|---|---|---|
| 2020/0339198 | A1* | 10/2020 | Takahashi | B62D 25/04 |
| 2021/0188361 | A1* | 6/2021 | Ishikawa | B62D 65/02 |
| 2024/0199127 | A1* | 6/2024 | Song | B60R 13/025 |
| 2025/0178545 | A1* | 6/2025 | Rupp | B60R 13/025 |
| 2025/0263028 | A1* | 8/2025 | Rupp | B62D 25/04 |
| 2025/0313164 | A1* | 10/2025 | Rupp | B60R 13/04 |
| 2025/0313271 | A1* | 10/2025 | Sakabe | B62D 25/02 |

FOREIGN PATENT DOCUMENTS

| | | | |
|---|---|---|---|
| JP | 2021151854 | A | 9/2021 |
| JP | 2023030726 | A | 3/2023 |
| KR | 100333860 | B1 | 4/2002 |

* cited by examiner

PILLAR GARNISH ASSEMBLY FOR A VEHICLE

BACKGROUND

The disclosed subject matter relates generally to a vehicle. More particularly, the disclosed subject matter relates to a pillar garnish assembly for an A-pillar of a vehicle.

Vehicles generally include pillar garnishes applied to A-pillars of the vehicles. It is important to design the A-pillar garnishes to properly guide the air flow over the pillar garnish from the front windshield to the sides of the vehicle. However, current pillar garnishes generally split the air flow prematurely and create wind noise, which is undesirable.

SUMMARY

In accordance with one embodiment of the present disclosure, a pillar garnish assembly for a vehicle is disclosed. The pillar garnish assembly comprises a pillar garnish adapted to be provided on a front surface of a pillar of the vehicle. The pillar garnish includes an inner pillar garnish structure adapted to be engaged with the pillar. The inner garnish structure has a first portion adapted to be connected to the pillar and cover the front surface of the pillar, and a second portion extending in a lateral direction from the first portion and arranged at a vertical offset from the first portion defining a step therebetween. Further, the second portion includes a free edge that is adapted to extend over a front windshield of the vehicle and defines a chamfer. Moreover, the pillar garnish includes an outer garnish structure arranged overlapping, at least partially, to the first portion and supported on the first portion of the inner garnish structure.

In accordance with another embodiment of the present disclosure, a vehicle is disclosed. The vehicle comprises a pair of pillars, a front windshield arranged between the pair of pillars, and a pair of pillar garnishes provided on front surfaces of the pair of pillars. Each pillar garnish includes an inner pillar garnish structure engaged with the pillar and has a first portion connected to associated pillar and arranged covering the front surface of the associated pillar. The inner garnish structure also includes a second portion extending in a lateral direction of the vehicle from the first portion and arranged at a vertical offset from the first portion defining a step therebetween. The second portion includes a free edge extending over the front windshield and defines a chamfer. Moreover, each pillar garnish includes an outer garnish structure arranged overlapping, at least partially, to the first portion and supported on the first portion of the inner garnish structure.

In accordance with yet a further embodiment of the present disclosure a vehicle is disclosed. The vehicle includes a pair of pillars, a front windshield arranged between the pair of pillars, a roof extending rearwardly from the front windshield, and a pair of side panels arranged on both sides of the roof and extending in a longitudinal direction of vehicle. The vehicle also includes a pair of drip moldings extending in the longitudinal direction along the roof and arranged between the roof and the pair of side panels. Each drip molding is arranged between the roof and the associated side panel such that a gap is defined between the drip molding and the associated side panel. The vehicle further includes a pair of pillar garnishes provided on front surfaces of the pair of pillars. Each pillar garnish includes an inner pillar garnish structure engaged with the pillar and having a first portion connected to associated pillar and arranged covering the front surface of the associated pillar. The inner garnish structure also includes a second portion extending in a lateral direction of the vehicle from the first portion and arranged at a vertical offset from the first portion defining a step therebetween. The second portion includes a free edge extending over the front windshield and defines a chamfer. Moreover, each pillar garnish has an outer garnish structure arranged overlapping, at least partially, to the first portion and supported on the first portion of the inner garnish structure. Further, a space is defined between the step and the outer garnish. Also, a width of the space defined between the step and the outer garnish structure is equal to a width of the gap defined between the associated drip molding and the associated side panel.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-4, wherein like numbers indicate the same or corresponding elements throughout the views.

Figure 1:
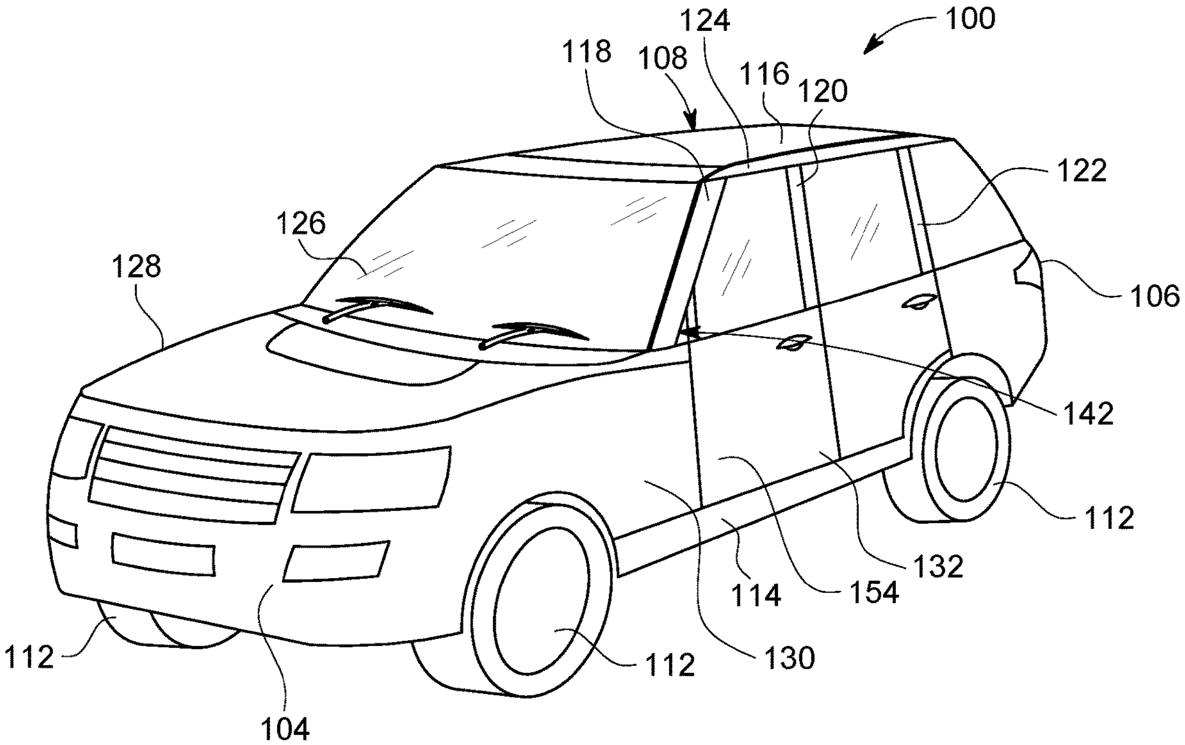
FIG. 1 is a perspective view of a vehicle, in accordance with one embodiment of the present disclosure.
Figure 2:
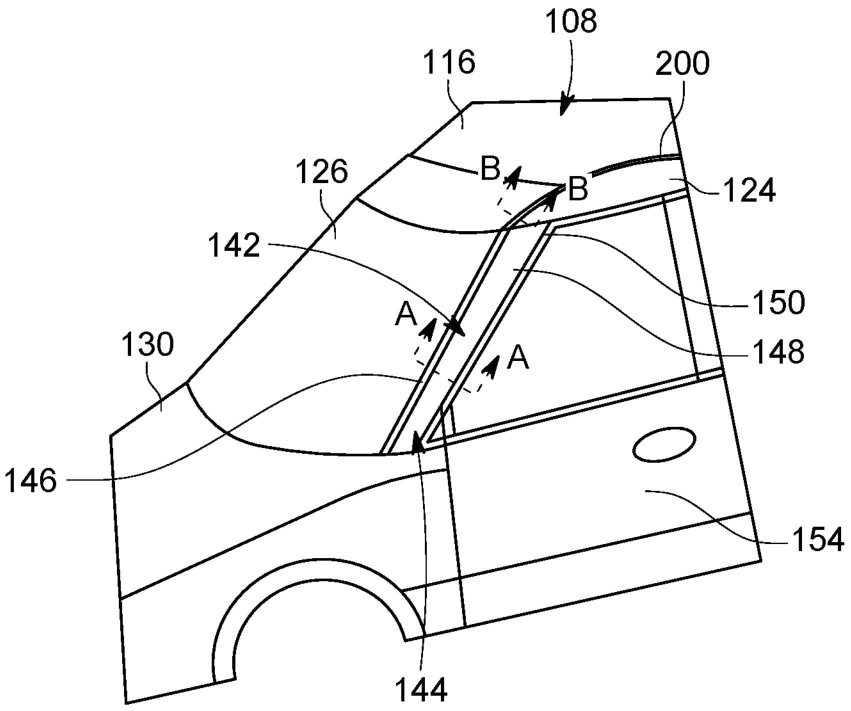
FIG. 2 is a perspective view of a vehicle body of the vehicle, in accordance with one embodiment of the present disclosure.

FIG. 1 illustrates a perspective view of a vehicle 100, in accordance with one embodiment of the present disclosure. As shown, the vehicle 100 includes a front end 104, a rear end 106, and a vehicle body 108 extending from the front end 104 to the rear end 106 and defining a passenger compartment for facilitating a seating of one or more passenger inside the vehicle 100. Further, the vehicle 100 includes a plurality of wheels 112 supporting the vehicle body 108 on a surface and enables a movement of the vehicle 100 over the surface. As shown in FIGS. 1 and 2, the vehicle body 108 includes a floor 114 on which one or more seats are mounted and a roof 116 arranged opposite to the floor 114 and supported on a plurality of pillars, for example, A-pillars 118, B-pillars 120, and C-pillars 122 of the vehicle body 108. Also, the vehicle body 108 includes a pair of side panels 124 arranged along longitudinal sides of the roof 116 and extending in a longitudinal direction of the vehicle 100, and the A-pillars 118, B-pillars 120 and the C-pillars 122 are connected to the side panels 124. It may be appreciated that the A-pillars 118 may form the extensions of the side panels 124 in the longitudinal and downward direction of the vehicle 100.

Further, the vehicle 100 includes a front windshield 126 arranged between the A-pillars 118 and the roof 116 of the vehicle 100. Moreover, the vehicle body 108 includes a bonnet 128 extending forwardly of the front windshield 126 to the front end 104 to cover an engine compartment from top, and a pair of fenders 130 extending along a portion of longitudinal sides 132 of the vehicle 100. The front windshield 126 includes a pair of edges 134 (shown in FIG. 3) extending from the bonnet 128 to the roof 116 and may be arranged at a lateral gap 140 (shown in FIG. 3) from the associated A-pillars 118. To cover the A-pillars 118 and the lateral gaps 140, the vehicle 100 includes a pair of garnish assemblies 142 extending along the A-pillars 118 from the bonnet 128 to the roof 116 in the vertical direction and covering the lateral gaps 140 and widths of the A-pillars 118 in a lateral direction of the vehicle 100. It may be appreciated that the pillar garnish assemblies 142 are similar in structure, arrangement, and assembly, and therefore only one pillar garnish assembly 142 is described in detail.

Figure 3:
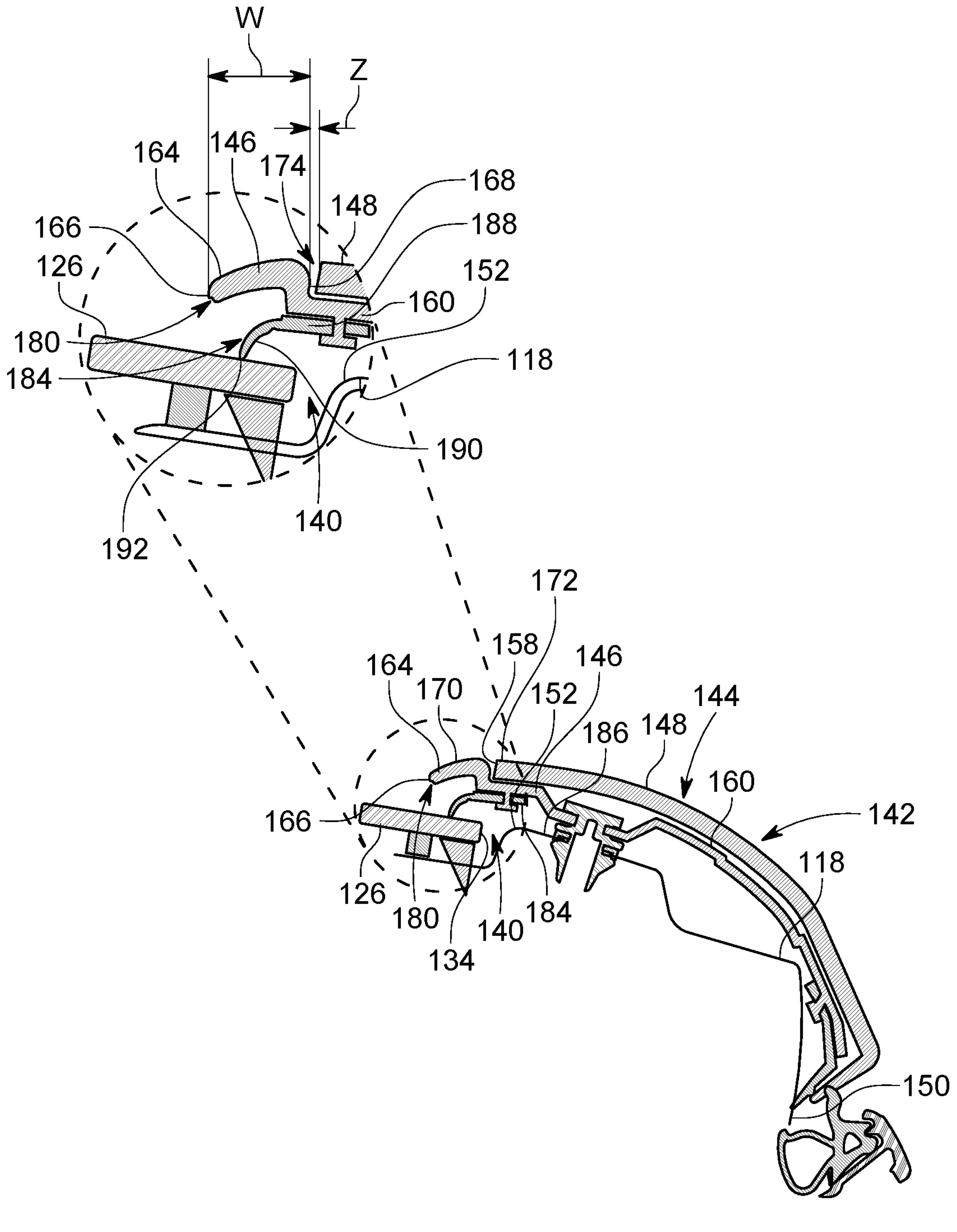
FIG. 3 is a sectional view of the vehicle body along section line A-A depicting a pillar garnish assembly of the vehicle, in accordance with one embodiment of the present disclosure.

As shown in FIG. 3, the pillar garnish assembly 142 includes a pillar garnish 144 extending along at least a portion of the A-pillar 118 and arranged covering an outer/front/upper surface 186 of the A-pillar 118. The pillar garnish 144 includes a first garnish structure 146 also referred to as inner garnish structure 146 and a second garnish structure 148 also referred to as outer garnish structure 148 arranged supported on the inner garnish structure 146 and extend along an entire width of the A-pillar 118 in the lateral direction of the vehicle 100 as well as the portion of the length of the A-pillar 118 extending from the roof 116 to the bonnet 128. As shown the outer garnish 148 includes a substantially arcuate shape and extends from a first edge 150 of the A-pillar 118 to a location proximate to a second edge 152 of the A-pillar 118. In the embodiment, the first edge 150 of the A-pillar 118 is arranged proximate to a front door 154 of the vehicle 100, while the second edge 152 of the A-pillar 118 is located proximate to the front windshield 126 and the lateral gap 140 is defined between the second edge 152 and the front windshield 126. As shown, the outer garnish 148 may extend at least partially above the lateral gap 140 defined between the A-pillar 118 and the front windshield 126. In some embodiments, an edge 158 of the outer garnish 148 is arranged proximate to the front windshield 126 and is aligned with the second edge 152 of the A-pillar 118.

The inner garnish structure 146 includes a first portion 160 connected to the A-pillar 118 and is arranged underneath/beneath the outer garnish 148 and is engaged with the outer garnish 148. As with the outer garnish 148, the first portion 160 extends from the first edge 150 to a location proximate to the second edge 152 of the A-pillar 118 in the lateral direction of the vehicle 100. As shown, the first portion 160 may extend at least partially above the lateral gap 140 defined between the A-pillar 118 and the front windshield 126. The first portion 160 is connected to the A-pillar 118 via suitable one or more engagement structures.

Further, the inner garnish structure 146 includes a second portion 164 arranged covering the lateral gap 140 and extending beyond the lateral gap 140 in the lateral direction, over the front windshield 126. The second portion 164 extends in the lateral direction from the first portion 160 and is arranged such that a free edge 166 of the second portion 164 is arranged above the front windshield 126. It may be appreciated that second portion 164 defines a lip of the inner garnish structure 146, and the lip extends in the lateral direction from the first portion 160. As seen from FIG. 3, the second portion 164 is arranged at a vertical offset from the first portion 160 and a step 168 is defined at an interface/junction of the first portion 160 and the second portion 164. In the illustrated embodiment, an upper surface 170 of the second portion 164 and an upper surface 172 of the outer garnish 148 are arranged aligned with each other. In some embodiments, a space 174 may be defined between the step 160 and the edge 158 of the outer garnish 148. Also, the free edge 166 of the second portion 164 defines a chamfer 180 to aerodynamically guide the air flow, and also facilitates noise reduction. As the chamfer 180 is on downward side of the inner garnish structure 146 and facing the front windshield 126, the air flow is deflected over the pillar garnish 144 without any flow detachment, reducing the wind noise as well.

Moreover, the pillar garnish assembly 142 includes a gasket/seal 184 connected to the inner garnish structure 146 and arranged contacting the front windshield 126 to prevent any leakage of the water or air underneath the inner garnish structure 146 and the outer surface/upper surface/front surface 186 of the A-pillar 118. As shown, the gasket 184 includes a first structure 188 extending along a part of the first portion 160 of the inner garnish structure 146 from the step 168 and connected to the first portion 160 via suitable connection mechanism. Also, the gasket 184 includes a second structure 190 extending along the second portion 164 from the step 168 and arranged underneath the second portion 164 and between the front windshield 126 and the second portion 164. Also, a free edge 192 of the second structure 190 contacts the front windshield 126 defining a sealing contact with the front windshield 126 to prevent a leakage of the water or air underneath the inner garnish structure 146 and above the A-pillar 118.

Figure 4:
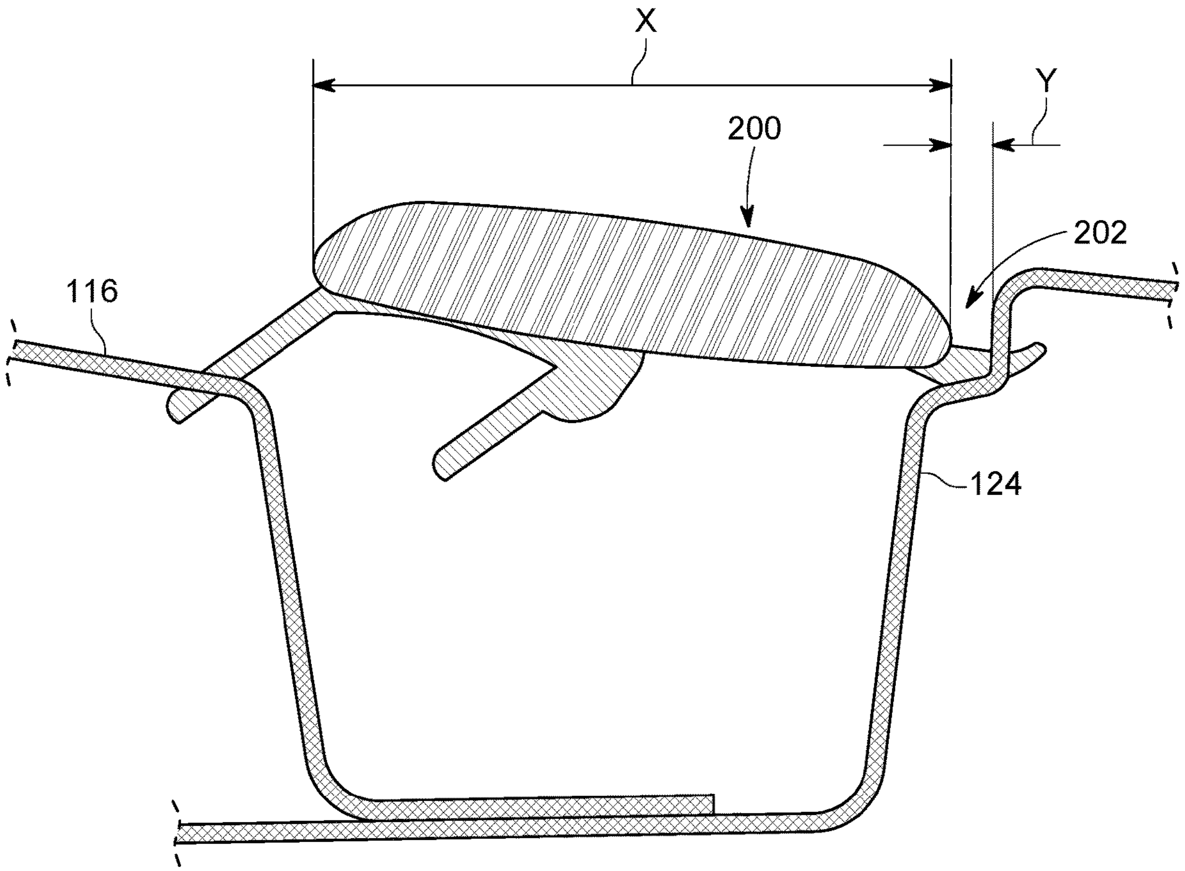
FIG. 4 is a sectional view of the vehicle body along section line B-B depicting a drip molding of the vehicle, in accordance with one embodiment of the present disclosure.

Additionally, as shown in FIG. 2 and FIG. 4, the vehicle 100 includes a drip molding 200 extending in a longitudinal direction of the vehicle 100 from the front windshield 126 towards the rear end 106 and is arranged between the roof 116 and the side panel 124 of the vehicle 100 in the lateral direction. It may be appreciated that a portion of the side panel 124 that extends downwardly from the roof 116 defines the A-pillar 118 of the vehicle 100. Also, the drip molding 200 is arranged such that the drip molding 200 appears to define an extension of the second portion 164 of the inner garnish structure 146 along the roof 116. As shown, dimensions of the drip molding 200 in the lateral direction are selected such that drip molding 200 includes a width 'X' that is substantially equal to a width 'W' of the second portion 164 of the inner garnish structure 146. Also, the drip molding 200 is arranged between the roof 116 and the side panel 124 such that a width 'Y' of a gap 202 defined between the drip molding 200 and the side panel 124 in the lateral direction is substantially equal to a width 'Z' of the space 174 defined between the step 168 and outer garnish 148 in the lateral direction. Accordingly, the second portion 164 of the inner garnish structure 146 is aligned with the drip molding 200 while the space 174 is aligned with the gap 202. Due to above mentioned dimensions and arrangement of the inner garnish structure 146 and the drip molding 200 a continuous appearance from the bottom of the front windshield 126 to the roof 116 is provided.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the disclosure be defined by the claims appended hereto.

What is claimed is:

1. A vehicle, comprising:

a pair of pillars;

a front windshield arranged between the pair of pillars;

a roof extending rearwardly from the front windshield;

a pair of side panels arranged on both sides of the roof and extending in a longitudinal direction of vehicle;

a pair of drip moldings extending in the longitudinal direction along the roof and arranged between the roof and the pair of side panels, each drip molding is arranged between the roof and the associated side panel such that a gap is defined between the drip molding and the associated side panel; and a pair of pillar garnishes provided on front surfaces of the pair of pillars, each pillar garnish including an inner pillar garnish structure engaged with the pillar and having a first portion connected to associated pillar and arranged covering the front surface of the associated pillar, and a second portion extending in a lateral direction of the vehicle from the first portion and arranged at a vertical offset from the first portion defining a step therebetween, the second portion includes a free edge extending over the front windshield and defines a chamfer, and an outer garnish structure arranged overlapping, at least partially, to the first portion and supported on the first portion of the inner garnish structure, wherein a space is defined between the step and the outer garnish, wherein a width of the space defined between the step and the outer garnish structure is equal to a width of the gap defined between the associated drip molding and the associated side panel.

2. The vehicle of claim 1, wherein a width of the drip molding in the lateral direction of the vehicle is equal to a width of the second portion of the inner garnish structure.

3. The vehicle of claim 1, wherein the outer garnish extends from the step in a direction opposite to the extension of the second portion from the step.

4. The vehicle of claim 1, wherein an upper surface of the second portion is arranged aligned with an upper surface of the outer garnish.

5. The vehicle of claim 1 further comprises a gasket arranged underneath the inner garnish structure and engaged with the inner garnish structure.

6. The vehicle of claim 5, wherein the gasket includes a first structure extending along the first portion of the inner garnish structure from the step and connected to the first portion, and a second structure extending along the second portion of the inner garnish structure from the step and including a free edge arranged contacting the front windshield of the vehicle.

* * * * *